United States Patent
DeBates et al.

(10) Patent No.: US 9,842,288 B1
(45) Date of Patent: Dec. 12, 2017

(54) RFID-BASED HAND SENSORY APPARATUS FOR MONITORING HANDLED INVENTORY

(71) Applicant: Motorola Mobility LLC, Chicago, IL (US)

(72) Inventors: Scott P. DeBates, Crystal Lake, IL (US); Douglas Alfred Lautner, Round Lake, IL (US); Mary Khun Hor-Lao, Chicago, IL (US); Jagatkumar V. Shah, Lake In The Hills, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/403,163

(22) Filed: Jan. 10, 2017

(51) Int. Cl.
*G06F 19/00* (2011.01)
*G06K 17/00* (2006.01)
*G06K 7/10* (2006.01)

(52) U.S. Cl.
CPC ..... *G06K 17/0022* (2013.01); *G06K 7/10366* (2013.01)

(58) Field of Classification Search
CPC ............. G06K 17/0022; G06K 7/10366
USPC ........................................... 235/385
See application file for complete search history.

(56) References Cited

U.S. PATENT DOCUMENTS

| 7,504,949 B1* | 3/2009 | Rouaix ................. G06Q 10/06 235/375 |
| 9,230,250 B1* | 1/2016 | Parker ................. G06Q 20/203 |
| 9,417,693 B2* | 8/2016 | Seth ........................ G06F 3/014 |
| 9,438,743 B1* | 9/2016 | Lee ........................ H04M 11/04 |
| 2014/0240214 A1* | 8/2014 | Liu ......................... G06F 3/039 345/156 |
| 2017/0086519 A1* | 3/2017 | Vigano' .............. A41D 19/0027 |
| 2017/0181488 A1* | 6/2017 | Perello ............. A41D 19/01594 |

* cited by examiner

Primary Examiner — Seung Lee

(57) ABSTRACT

In aspects of a RFID-based hand sensory apparatus for monitoring handled inventory, a wearable article is worn by a user who moves items, or a container of items, and each of the items has an RFID tag. A tracking system implemented in the wearable article includes force sensors to register a force on an item or the container, and includes a motion sensor to sense motion of the wearable article. Tracking logic of the tracking system initiates an RFID reader to interrogate the RFID tags of the items based on the registered force on the item or the container, and based on the motion of the wearable article. The RFID reader may be integrated in a wearable article, may be an external device, and/or may be affixed to the container of items and initiated when the container is moved.

20 Claims, 6 Drawing Sheets

RFID-BASED HAND SENSORY APPARATUS FOR MONITORING HANDLED INVENTORY

BACKGROUND

The on-line shopping market is ever-expanding, primarily due to the convenience afforded a shopper who can shop, order, pay for, and have products delivered, all from a computing device in the comfort of home. A downside to the on-line shopping market from a customer standpoint is waiting for an ordered product to be delivered, and hoping that the product ordered is actually the product delivered. One of the challenges for product inventory, handling, and distribution companies is guaranteeing that the products pulled to fulfill a customer order are the correct products as ordered, and before the products are shipped out to the customer. Conventional product handling and distribution systems rely on the warehouse staff pulling the correct, ordered products from the warehouse shelves and then sending the ordered products to others who pack and ship the products. If incorrect products are not detected and ultimately shipped to the consumer, the results are lost time and money for a distribution company and an unsatisfactory user experience for the consumer.

BRIEF DESCRIPTION OF THE DRAWINGS

Aspects of a RFID-based hand sensory apparatus for monitoring handled inventory are described with reference to the following Figures. The same numbers may be used throughout to reference like features and components that are shown in the Figures.

DETAILED DESCRIPTION

Figure 1:
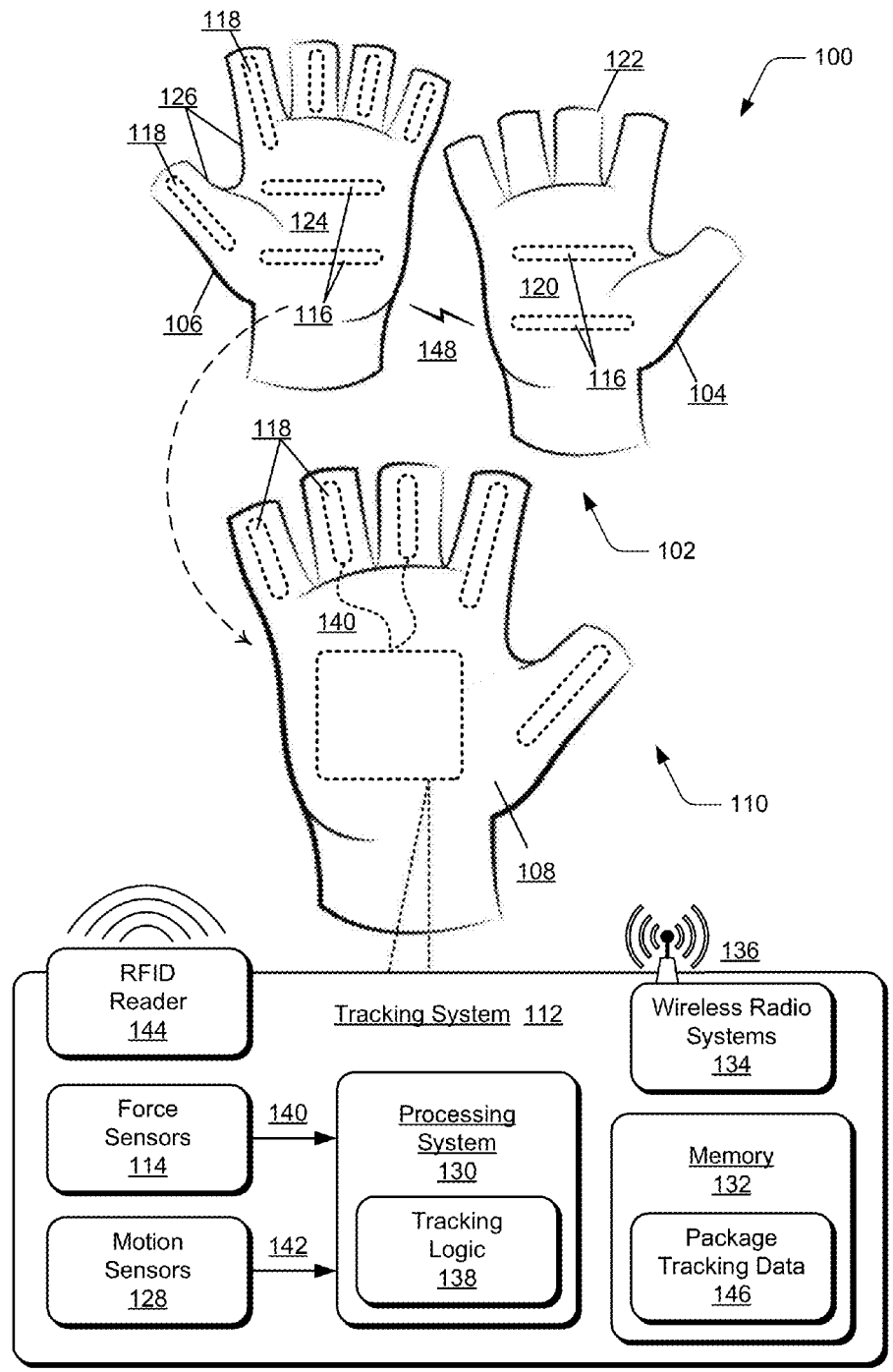
FIG. 1 illustrates an example system in which aspects of a RFID-based hand sensory apparatus for monitoring handled inventory can be implemented.

A RFID-based hand sensory apparatus for monitoring handled inventory is described, and may be implemented as a wearable article that is worn by a user who moves items and objects. For example, wearable articles may be a pair of wireless, sensor-based gloves with force and/or motion sensors integrated in one or both of the gloves of the pair of gloves. The pair of gloves are wearable by a user who pushes or grasps and moves items, or a container of items, and a tracking system is implemented in at least one glove of the pair of gloves. The pair of gloves implemented as the RFID-based hand sensory apparatus for monitoring handled inventory are designed to be worn by a person who works as a package handler for a package delivery company, such as in a package handling and distribution facility. Although the RFID-based hand sensory apparatus is described throughout as being implemented as the pair of gloves, it should be noted that the techniques described herein can be implemented for any form of a wearable article or apparatus on the hand or foot of a user, such as a glove or gloves, and exoskeleton system or apparatus, a bandage or other hand covering, a ring worn by the user, a mechanism (e.g., a sticker) attachable to the palm of a user's hand, a sock or other foot covering, a shoe or boot insert, and/or for any other wearable article, attached item, or mechanism that attaches to an appendage of a user.

The tracking system includes the force sensors in a wearable article to register a force on an item, such as an individual item, an object, a package that may contain an item or items, or a container of one or more items. For example, various items may be batched together in a container to fulfill a consumer products order in a package handling and distribution facility. Each of the items has a radio-frequency identification (RFID) tag that uniquely identifies one of the respective items. The force sensors in a glove or pair of gloves implemented as the wearable article can include a palm force sensor, or sensors, as well as finger force sensors. The force sensors in a wearable article register a force on an item, or on the container of items. The tracking system that is implemented in the wearable article may also include a motion sensor to sense motion of the wearable article.

The tracking system includes tracking logic that initiates an RFID reader to interrogate the RFID tags of the items based on the force on the item or the container, and based on the motion of the wearable article. The force that is detected by the force sensors may correlate to the force of a grasp or the force of a push on the item or on the container of items. In implementations, the RFID reader can be implemented as part of the tracking system in a wearable article, such as in at least one glove of the pair of gloves. Alternatively or in addition, the RFID reader is affixed to the container of items to interrogate the RFID tags of the items in the container. Further, the tracking system can include a wireless radio system to communicate with an independent device that is in communication with the tracking system of the wearable article, and the RFID reader that interrogates the RFID tags of the items is implemented in the independent device. Further, for the pair of gloves, the tracking system can be implemented in both of the gloves, and the respective wireless radio systems of the tracking systems are used to synchronize tracking data between the tracking systems of the pair of gloves, and with other devices.

In aspects of a RFID-based hand sensory apparatus for monitoring handled inventory, the items or container of items that are handled by the user who wears the wearable article may be packages for delivery, such as a batch of products that have been ordered by a customer and are collected into a single container for packaging and shipping to the customer. The tracking logic can verify that an item, or group of items, corresponds to an order for the item or group of items based on the identification responses to the RFID reader from each of the RFID tags associated with the respective items. The tracking logic can also generate real-time user feedback as verification that an item corresponds to the order for the item. In implementations, the user feedback can be a visible verification (e.g., displayed on a display device), an audio verification, or a haptic feedback verification that the item corresponds to the order for the item.

While features and concepts of a RFID-based hand sensory apparatus for monitoring handled inventory can be implemented in any number of different devices, systems, environments, and/or configurations, aspects of a RFID-based hand sensory apparatus for monitoring handled inventory are described in the context of the following example devices, systems, and methods.

FIG. 1 illustrates an example system 100 in which aspects of RFID-based hand sensory apparatus for monitoring handled inventory can be implemented, such as a pair of wireless, sensor-based gloves 102 as wearable articles. As noted above, although a wearable article implemented as a RFID-based hand sensory apparatus is described throughout as a pair of gloves, the techniques described herein can be implemented for any form of a wearable article or apparatus on a hand or foot of a user. The example system 100 includes the pair of gloves 102 that are a right-hand glove 104 and a left-hand glove 106, as viewed from the palm side of the gloves. The back 108 of the left-hand glove 106 is also shown at 110 with the glove flipped over. The pair of gloves 102 are designed to be worn by a user who pushes or grasps and moves items, such as person who works as a package handler for a package delivery company in a package handling and distribution facility.

As noted above, a tracking system 112 integrated with the pair of gloves 102 can register a force applied to push or grasp and pick up an item or a container of items, as well as detect motion when a glove or the pair of gloves 102 move while the user is holding the item or the container of items. The tracking system 112 can be implemented in one or both gloves of the pair of gloves 102. Although FIG. 1 generally illustrates the tracking system implemented in the left-hand glove 106, the tracking system 112 may be implemented in the right-hand glove 104, or implemented in both of the gloves of the pair of gloves 102. Unless specifically indicated, the term "glove" as used herein applies to either of the right-hand glove 104, the left-hand glove 106, or both gloves of the pair of gloves 102.

The tracking system 112 includes a force sensor 114, or force sensors, integrated in the gloves 102 to register a force of a push or grasp on an item or a container of items when a user pushes or picks up and moves the item or the container. The force sensors 114 in a glove can include a palm force sensor 116, or sensors, as well as finger force sensors 118. For example, the right-hand glove 104 is shown having two palm force sensors 116 integrated in the palm region 120 of the glove. Although the right-hand glove 104 is shown having the two palm force sensors 116, a glove may be implemented with one palm force sensor 116 of the tracking system 112, or with more than two palm force sensors. In an implementation, a glove may include only a palm force sensor 116, or sensors, of the tracking system. The fingers 122 of the right-hand glove 104 do not include finger force sensors in this example.

The left-hand glove 106 is also shown having two palm force sensors 116 integrated in the palm region 124 of the glove. Additionally, the fingers 126 of the left-hand glove 106 include the finger force sensors 118. As generally described herein, the thumb of a glove is referred to collectively as one of the fingers 126 of the glove. Further, although all of the fingers 126 of the left-hand glove 106 are shown having an integrated finger force sensor 118, any number of the fingers 126 of the glove may or may not include a finger force sensor.

In implementations, the tracking system 112 can also include a motion sensor 128, or motion sensors, to sense motion of the glove as the user picks up and moves an item, or a container of items, while wearing the pair of gloves 102. The tracking system 112 may be implemented with one or various motion sensors 128, such as a gyroscope, an accelerometer, and/or other types of motion sensors to sense motion of the glove or in the pair of gloves 102 in which the tracking system 112 is integrated.

Generally, the tracking system 112 can be implemented with computing and/or electronic device components such as a processing system 130 (e.g., one or more processors), a memory 132, and any number and combination of various components as further described with reference to the example device shown in FIG. 6. Additionally, the tracking system 112 includes a power source, such as a battery, to power the various components of the tracking system.

Further, the tracking system 112 can include various, different wireless radio systems 134, such as for Wi-Fi, Bluetooth™, Mobile Broadband, LTE, Near Field Communication (NFC), or any other wireless radio system or format for communication via respective wireless networks (e.g., the wireless network as described with reference to FIG. 2). Generally, the tracking system 112 implements the wireless radio systems 134 that each include a radio device, antenna 136, and chipset that is implemented for cellular, wireless, and/or other network communication with other devices, networks, and services. A wireless radio system 134 can be configured to implement any suitable communication protocol or standard.

The tracking system 112 includes tracking logic 138 that can be implemented as a software application or module, such as computer-executable software instructions that are executable with a processor (e.g., with the processing system 130). Similarly, the tracking system 112 may also include an operating system as a software application. The tracking system 112 and/or the operating system can be stored on computer-readable storage memory (e.g., the memory 132), such as any suitable memory device or electronic data storage implemented with the tracking system.

In aspects of a RFID-based hand sensory apparatus for monitoring handled inventory, the tracking logic 138 receives force sensor inputs 140 from the force sensor or sensors 114, and can receive motion sensor inputs 142 from the motion sensor or sensors 128. The force sensor inputs 140 and/or the motion sensor inputs 142 are an indication to the tracking logic 138 that a user who is wearing the pair of gloves 102 has picked up and is moving an item, or a container of items. The lifting motion to pick up an item is determined by the tracking logic 138 based on the force sensor inputs 140 and/or the motion sensor inputs 142. The tracking logic 138 is implemented to then initiate an RFID reader to interrogate the RFID tags of the items based on the force of the grasp on the item or the container, and based on the motion of the glove or pair of gloves 102. The RFID reader interrogates the RFID tags of the items and receives an identification response from each of the RFID tags associated with the respective items (e.g., a unique identifier of each of the interrogated items). The interrogation scanning of the RFID tags is implemented to scan in close proximity (e.g., within one meter) so as to receive the identification responses from only the item or items in the container that has been picked up and is currently being moved, while avoiding detection of other items in the area or region.

In implementations, the RFID reader that is initiated to interrogate the RFID tags of the items can be implemented as a RFID reader 144 of the tracking system 112 in at least one glove of the pair of gloves 102. Alternatively or in addition, the RFID reader is affixed to the container of items to interrogate the RFID tags of the items in the container, as shown and further described with reference to FIG. 2. Further, the tracking system 112 can include the wireless radio system or systems 134 to communicate with an independent device that is in communication with the tracking system 112 of the at least one glove, and the RFID reader that interrogates the RFID tags of the items is implemented in the independent device. The RFID reader may be any wearable or other proximate device that is closely associated with the user who is wearing the pair of gloves 102 and handling the items.

Additionally, as noted above, the tracking system 112 may be implemented in both gloves of the pair of gloves 102, and the wireless radio system 134 in each of the respective tracking systems 112 for the right-hand glove 104 and the left-hand glove 106 can be utilized to synchronize package tracking data 146 and the timing of data reporting between the tracking systems of the pair of gloves (at 148). The package tracking data 146 can include the unique package or item identifiers and any other tracking data related to the identification of an item, a package, or a container of items that a user picks up and moves while wearing the pair of gloves 102. Further, as described with reference to FIG. 2, a wireless radio system 134 of the tracking system 112 can communicate the package tracking data 146 to another, independent device that is in communication with the tracking system 112 of the glove, or as implemented in both the left-hand and the right-hand gloves of the pair of gloves 102.

In aspects of a RFID-based hand sensory apparatus for monitoring handled inventory, the items or container of items that are handled by the user who wears the pair of gloves 102 may be packages for delivery, such as a batch of products that have been ordered by a customer and are collected into a single container for packaging and shipping to the customer. The tracking logic 138 can verify that an item, or group of items, corresponds to an order for the item or group of items based on the identification responses to the RFID reader 144 from each of the RFID tags associated with the respective items. The tracking logic 138 can also generate real-time user feedback as verification that an item corresponds to the order for the item. In implementations, the user feedback can be a visible verification (e.g., displayed on a display device, or a light indication), an audio verification, or a haptic feedback verification that the item corresponds to the order for the item.

Figure 2:
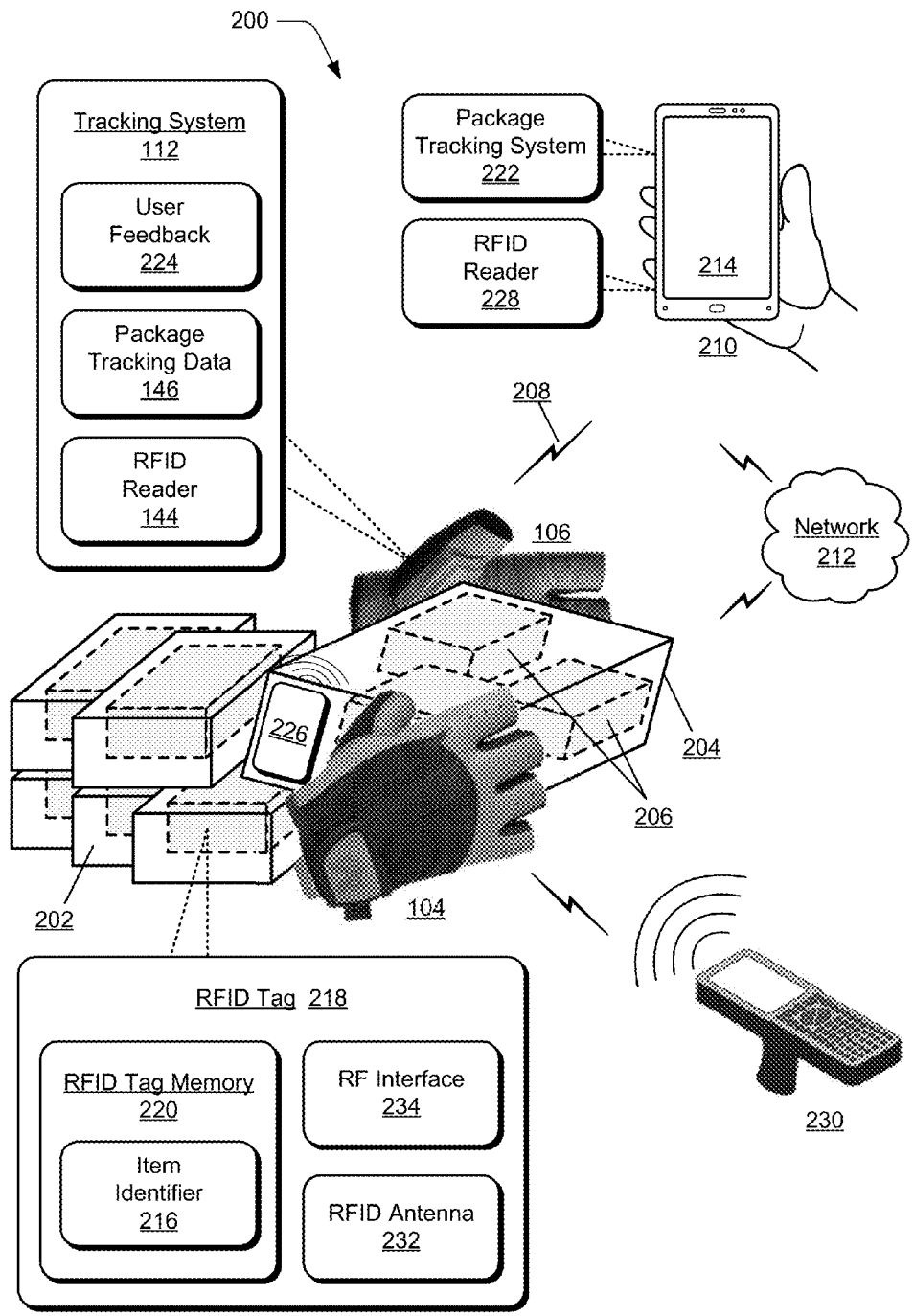
FIG. 2 further illustrates an example system in which aspects of a RFID-based hand sensory apparatus for monitoring handled inventory can be implemented.

FIG. 2 further illustrates an example system 200 for a RFID-based hand sensory apparatus for monitoring handled inventory as described with reference to the pair of wireless, sensor-based gloves shown in FIG. 1. As noted above, a user can wear the pair of gloves 102 (i.e., the right-hand glove 104 and the left-hand glove 106 as wearable articles) while handling and moving items 202 (e.g., packages, products, objects, etc.), or a container 204 of items 206, in a package handling and distribution facility. The tracking system 112 that is integrated in the right-hand glove 104, the left-hand glove 106, or in both gloves of the pair of gloves 102 includes the wireless radio system 134, which can communicate (at 208) the package tracking data 146 to another device 210 that is in communication with the tracking system 112 of the glove or pair of gloves.

In implementations, the device 210 may be any type of mobile phone, tablet device, computing device (e.g., portable and desktop computers), consumer electronic device, or other type of computing and electronic device that is implemented to communicate, via a network 212 (e.g., a Wi-Fi network) with the tracking system 112 that is integrated in the glove or gloves 102. The device 210 can be implemented with various components, such as an integrated display device 214, and with any number and combination of various components as further described with reference to the example device shown in FIG. 6.

The package tracking data 146 that is communicated to the device 210 can include the unique item identifiers 216 of the items (e.g., a unique identifier of each of the interrogated items) as received in the identification response from each of the RFID tags 218 associated with the respective items 202. An RFID reader, such as the RFID reader 144 of the tracking system 112 in at least one glove of the pair of gloves 102, can be used to interrogate the RFID tag 218 of each of the items 202, or the items 206 in the container 204. An RFID tag memory 220 in each respective RFID tag 218 can store a unique item identifier 216 for each respective one of the items 202, or the items 206 in the container 204.

The device 210 can include a package tracking system 222 (e.g., a software application) to track the packages (e.g., the items 202, or the items 206 in the container 204) in a package handling and distribution facility as the user picks up and moves the packages while wearing the pair of gloves 102. The package tracking system 222 at the device 210 can receive the package tracking data 146 from the tracking system 112 of the pair of gloves 102, and verify that an item 202, or group of items 206 (e.g., packages for delivery to a customer), corresponds to a consumer order for the item or group of items based on the identification responses to an RFID reader from each of the RFID tags 218 associated with the respective items 202, 206.

The device 210 can also receive user feedback 224 from the tracking system 112 of the pair of gloves 102. The tracking logic 138 can generate the user feedback 224 in real-time as verification that an item corresponds to the order for the item. The user feedback 224 can be communicated to the device 210 as any type of audio or visual feedback, such as for display on the integrated display device 214 to indicate that all of the identified items correspond to the consumer order for the items before they are shipped to the customer.

As noted above, an RFID reader that is initiated to interrogate the RFID tags 218 of each of the items 202, 206 can be implemented as the RFID reader 144 of the tracking system 112 in at least one glove of the pair of gloves 102. Alternatively or in addition, an RFID reader 226 is affixed to the container 204 of the items 206 to interrogate the RFID tags 218 of the items 206 in the container. Further, the tracking system 112 can communicate with the independent device 210, which can implement an RFID reader 228 that interrogates the RFID tags 218 of the items 202, 206. Generally, the RFID reader may be any wearable or other proximate device 230 that is closely associated with the user who is wearing the pair of gloves 102 and handling the items so that the interrogation scanning of the RFID tags 218 is in close proximity, and the identification responses are received from only the item 202 or the items 206 in the container 204 that has been picked up and is currently being moved, while avoiding detection of other items in the area or region.

The RFID tag 218 is implemented with each item 202, 206 for two-way wireless communication with the RFID readers, such as the RFID reader 144 (also referred to as a RFID interrogator) that interrogates the RFID tag 218 for the unique item identifier 216 that is stored in the RFID tag memory 220. Generally, RFID tags 218 are small electronic tags or labels that can be programmed with data and other information. An RFID reader 144 can transmit an interrogation signal as a broadcast message requesting RFID tags that are in range to return the data and information that the RFID tags have stored. The RFID tags 218 can then wirelessly communicate the data and information to the RFID reader via a radio frequency (RF) communication channel, which the RFID reader 144 receives as RFID tag information.

An RFID tag 218 can include a RFID antenna 232, and a transmitter and receiver (or may be implemented as a transceiver) for two-way communication with an RFID reader. In response to receipt of an interrogation signal, an ASIC/CPU module of the RFID tag 218 formulates a response that may include data (e.g., the item identifier 216) from the RFID tag, and the response is wirelessly transmitted to the RFID reader. The response signals from a RFID tag 218 can be communicated using low frequency (LF), high frequency (HF), or ultra-high frequency (UHF) radio waves. The RFID tag memory 220 (e.g., non-volatile memory) can be accessed by an RFID reader via a radio frequency (RF) interface 234 of the RFID tag 218.

The network 212 generally represents any type of communication and data network, and any of the server and devices, as well as the tracking system 112 described herein, can communicate via the network 212 (or combination of networks), such as for data communication between the device 210 and the tracking system 112 that is integrated in one or both gloves of the pair of gloves 102. The network 212 can be implemented to include wired and/or wireless network. The network can also be implemented using any type of network topology and/or communication protocol, and can be represented or otherwise implemented as a combination of two or more networks, to include cellular networks, IP-based networks, and/or the Internet. The network 212 may also include mobile operator networks that are managed by a network provider of a cellular network, a mobile network operator, and/or other network operators, such as a communication service provider, mobile phone provider, and/or Internet service provider.

Example methods 300 and 500 are described with reference to respective FIGS. 3 and 5 in accordance with implementations of a RFID-based hand sensory apparatus for monitoring handled inventory. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
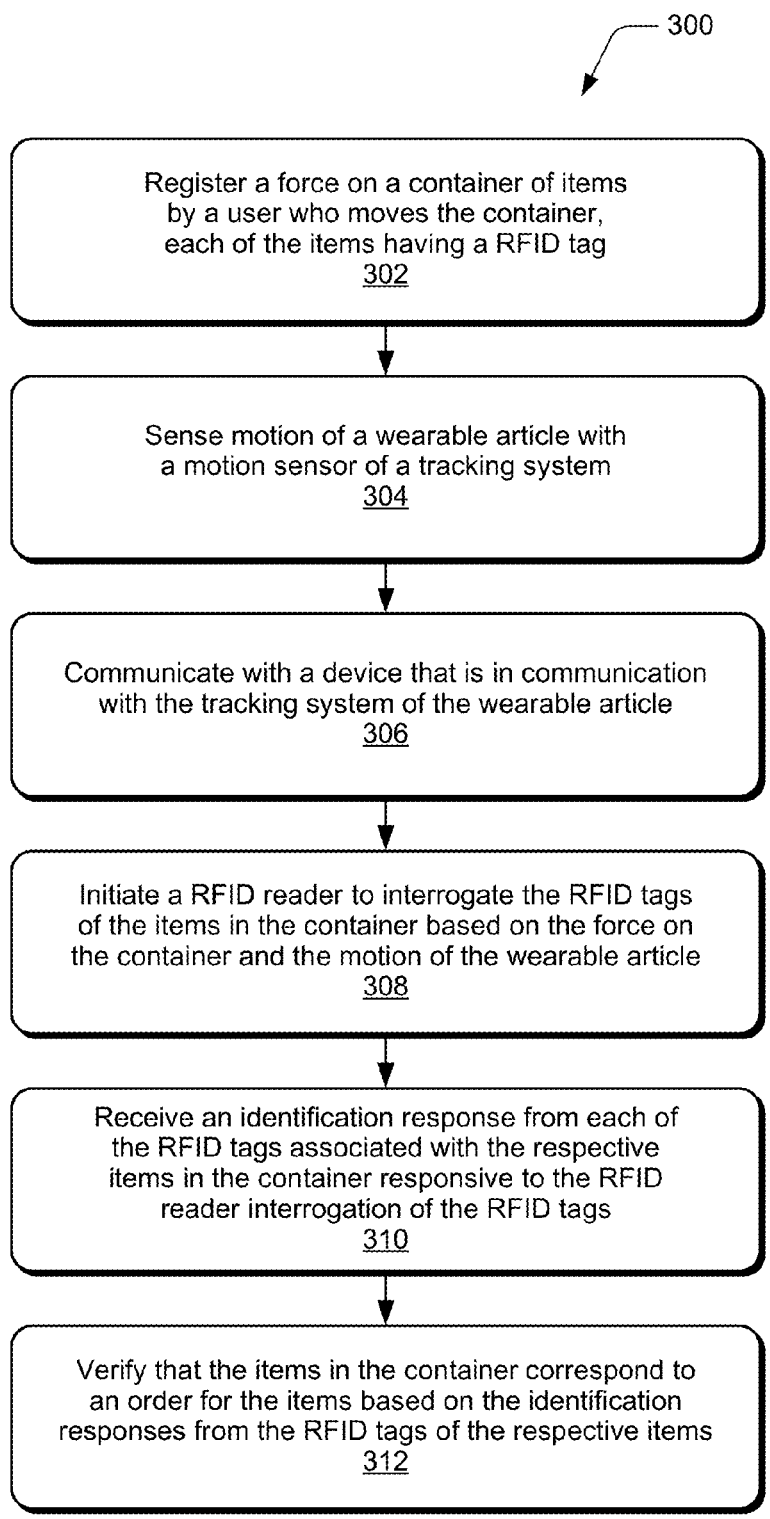
FIG. 3 illustrates example method(s) of a RFID-based hand sensory apparatus for monitoring handled inventory in accordance with techniques described herein.

FIG. 3 illustrates example method(s) 300 of a RFID-based hand sensory apparatus for monitoring handled inventory as described herein, and the method is generally described with reference to the tracking system implemented in a wearable article. The order in which the method is described is not intended to be construed as a limitation, and any number or combination of the described method operations can be performed in any order to perform a method, or an alternate method.

At 302, a force on a container of items by a user who moves the container is registered, and each of the items has a radio-frequency identification (RFID) tag. For example, the tracking system 112 includes the force sensor 114, or force sensors, integrated in the pair of gloves 102 (e.g., wearable articles) to register a force on an item 202 or a container 204 of the items 206 when a user picks up and moves the item or the container. The force is registered with a force sensor 114 of the tracking system 112 that is implemented in at least one glove of a pair of gloves 102 that are wearable by the user.

At 304, motion of the wearable article is sensed with a motion sensor of a tracking system. For example, the tracking system 112 also includes the motion sensor 128, or motion sensors, to sense motion of the glove or gloves 102 as the user picks up and moves an item 202, or the container 204 of the items 206, while wearing the pair of gloves.

At 306, the tracking system communicates with a device that is in communication with the tracking system of the wearable article. For example, the tracking system 112 includes the wireless radio system or systems 134 and communicates with the independent device 210 that is in communication with the tracking system 112 of the at least one glove or pair of gloves 102, and the device 210 can include an RFID reader to interrogate the RFID tags 218 of the items 202, or the items 206 in the container 204.

At 308, a RFID reader is initiated to interrogate the RFID tags of the items in the container based on the force on the container and the motion of the wearable article. For example, the tracking logic 138 implemented in the tracking system 112 receives the force sensor inputs 140 from the force sensor or sensors 114, and receives the motion sensor inputs 142 from the motion sensor or sensors 128. The force sensor inputs 140 and the motion sensor inputs 142 are an indication to the tracking logic 138 that a user who is wearing the pair of gloves 102 has picked up and is moving an item 202, or is moving the container 204 of the items 206. The tracking logic 138 initiates an RFID reader to interrogate the RFID tags 218 of the items 202, 206 based on the force on the item or the container, and based on the motion of the glove or pair of gloves 102. The RFID reader 226 can be affixed to the container 204 to interrogate the RFID tags 218 of the items 206 in the container. Alternatively or in addition, the tracking system 112 that is implemented in at least one glove of the pair of gloves 102 includes the RFID reader 144 that interrogates the RFID tags 218 of the items 206 in the container 204. Alternatively, as noted above, the device 210 implements the RFID reader 228 that interrogates the RFID tags 218 of the items 206 in the container 204.

At 310, an identification response is received from each of the RFID tags associated with the respective items in the container responsive to the RFID reader interrogation of the RFID tags. For example, the RFID reader that interrogates the RFID tags 218 of the items 202, 206 receives an identification response from each of the RFID tags 218 associated with the respective items (e.g., as the unique item identifier 216 of each of the interrogated items).

At 312, the items in the container are verified as corresponding to an order for the items based on the identification responses from the RFID tags of the respective items. For example, the items 202 or the container 204 of the items 206 that are handled by the user who wears the pair of gloves 102 may be packages for delivery, such as a batch of products that have been ordered by a customer and are collected into the single container 204 for packaging and shipping to the customer. The tracking logic 138 verifies that an item, or the group of items, corresponds to an order for the item or group of items based on the identification responses to the RFID reader from each of the RFID tags 218 associated with the respective items 202, 206.

Figure 4:
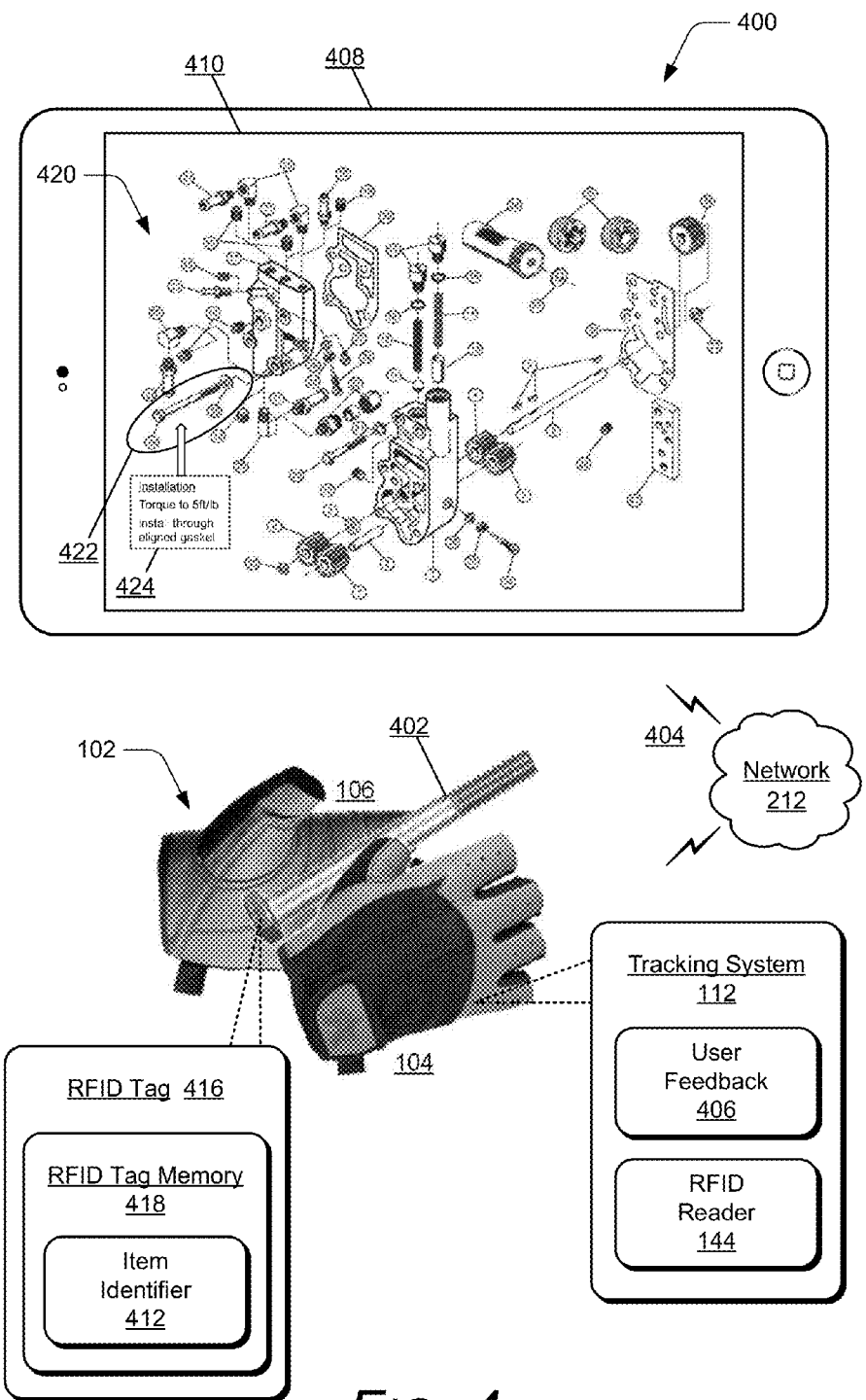
FIG. 4 further illustrates an example system in which aspects of a RFID-based hand sensory apparatus for monitoring handled inventory can be implemented.

FIG. 4 further illustrates an example system 400 for a RFID-based hand sensory apparatus for monitoring handled inventory as described with reference to the pair of wireless, sensor-based gloves shown in FIG. 1 as wearable articles. In this example, "handled inventory" refers to items or components that a user picks up and moves for assembly in some type of a structure, which may be any type of a vehicle, vessel, or automotive assembly (e.g., an engine, gearbox, and the like), part of a building (e.g., a steel constructed structure), an item used in a medical procedure (e.g., installed in a patient), and even children's toys that involve multiple parts and pieces that a child can repeatedly put together and take apart. These are merely a few scenarios of the many possible examples of items or components that may be assembled in any type of a structure.

As noted in the description above, a user can wear the pair of gloves 102 (i.e., the right-hand glove 104 and the left-hand glove 106 as the wearable articles) while handling and moving a component 402 (e.g., an item, an object, etc.), such as while assembling any type of a structure, which may be related to automotive, construction of a building, an assembly line, putting together a consumer product, playing with a toy designed to be repeatedly taken apart and put together, etc. The tracking system 112 that is integrated in the right-hand glove 104, the left-hand glove 106, or in both gloves of the pair of gloves 102 includes the wireless radio system 134, which can communicate (at 404) the user feedback 406 to another device 408 that is in communication with the tracking system 112 of the glove or pair of gloves.

In implementations, the device 408 may be any type of mobile phone, tablet device, computing device (e.g., portable and desktop computers), consumer electronic device, or other type of computing and electronic device that is implemented to communicate, via the network 212 (e.g., a Wi-Fi network) with the tracking system 112 that is integrated in the glove or gloves 102. The device 408 can be implemented with various components, such as an integrated display 410, and with any number and combination of various components as further described with reference to the example device shown in FIG. 6.

The user feedback 406 that is communicated to the device 410 can include the unique item identifier 412 of the component 402 as received in an identification response from the RFID tag 416 that is associated with the component 402. An RFID reader, such as the RFID reader 144 of the tracking system 112 in at least one glove of the pair of gloves 102, can be used to interrogate the RFID tag 416 of the component 402. The RFID tag memory 418 in the RFID tag 416 can store the unique item identifier 412 of the component 402.

The device 408 can receive the user feedback 406 as the unique item identifier 412 of the component 402 from the tracking system 112 of the pair of gloves 102. The device 408 can then display a visual indication 420 of where to install the component in a structure and/or how to install the component in the structure. For example, an exploded assembly diagram of a vehicle system (e.g., a structure) is displayed on the device 408 as the visual indication 420. Other indications can also be displayed to assist the user with component placement in the structure. For example, the component 402, which the user has picked up and/or is moving, is identified in the exploded assembly diagram with a visual indication 422 that indicates where to install the component. Although shown as an oval with a solid black line around the component 402 in the exploded assembly diagram in this example, the visual indication 422 may be any type of visually noticeable feature, such as different line types (e.g., solid, dashed, etc.), different colors, use of shading features, an arrow pointing to the item, and the like. Another visual indication 424 also indicates how to install the component 402 in the structure, such as the installation torque for the bolt component and an alignment instruction. Similarly, the visual indications may be displayed on the device 408 when the user picks up a hydraulic tool to screw the bolt component into the structure, and the torque setting is automatically adjusted on the tool for the proper setting to install the bolt component.

As noted above, an RFID reader that is initiated to interrogate the RFID tag 416 of the component 402 can be implemented as the RFID reader 144 of the tracking system 112 in at least one glove of the pair of gloves 102. Alternatively or in addition, the tracking system 112 can communicate with the independent device 408, which can implement an RFID reader that interrogates the RFID tag 416 of the component 402. Generally, the RFID reader may be any wearable or other proximate device that is closely associated with the user who is wearing the pair of gloves 102 and handling the items so that the interrogation scanning of the RFID tag 416 is in close proximity, and the identification responses are received from only the component 402 that has been picked up and is currently being moved, while avoiding detection of other components in the area or region.

Figure 5:
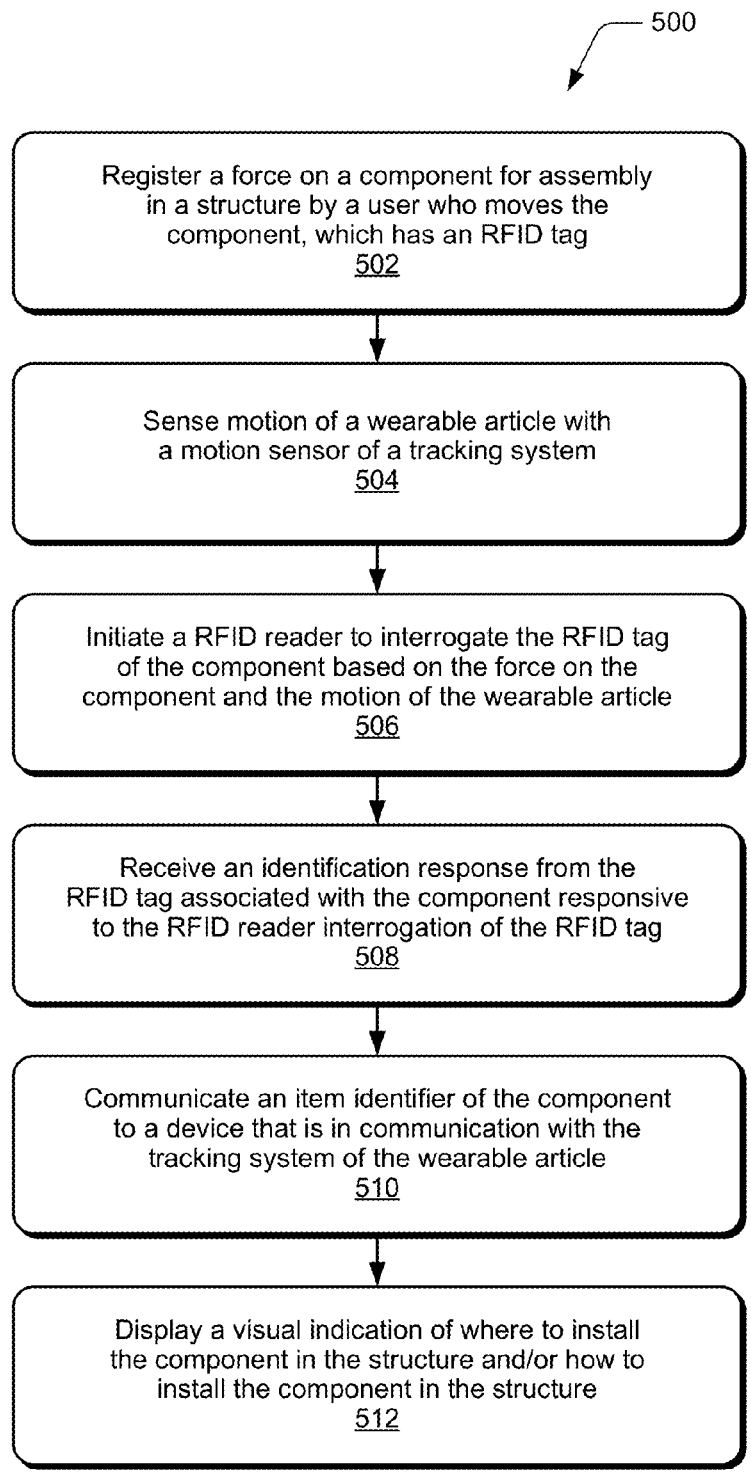
FIG. 5 illustrates example method(s) of a RFID-based hand sensory apparatus for monitoring handled inventory in accordance with techniques described herein.

FIG. 5 illustrates example method(s) 500 of a RFID-based hand sensory apparatus for monitoring handled inventory as described herein, and the method is generally described with reference to the tracking system implemented in a wearable article. The order in which the method is described is not intended to be construed as a limitation, and any number or combination of the described method operations can be performed in any order to perform a method, or an alternate method.

At 502, a force on a component for assembly in a structure by a user who moves the component is registered, and the component has a radio-frequency identification (RFID) tag. For example, the tracking system 112 includes the force sensor 114, or force sensors, integrated in the pair of gloves 102 (e.g., wearable articles) to register a force on the component 402 when a user picks up and/or moves the component. The force is registered with a force sensor 114 of the tracking system 112 that is implemented in at least one glove of a pair of gloves 102 that are wearable by the user.

At 504, motion of the wearable article is sensed with a motion sensor of a tracking system. For example, the tracking system 112 also includes the motion sensor 128, or motion sensors, to sense motion of the glove or gloves 102 as the user picks up and moves the component 402 while wearing the pair of gloves.

At 506, a RFID reader is initiated to interrogate the RFID tag of the component based on the force on the component and the motion of the wearable article. For example, the tracking logic 138 implemented in the tracking system 112 receives the force sensor inputs 140 from the force sensor or sensors 114, and receives the motion sensor inputs 142 from the motion sensor or sensors 128. The force sensor inputs 140 and the motion sensor inputs 142 are an indication to the tracking logic 138 that a user who is wearing the pair of gloves 102 has picked up and is moving the component 402. The tracking logic 138 initiates an RFID reader to interrogate the RFID tag 416 of the component 402 based on the force on the item or the container, and based on the motion of the glove or pair of gloves 102. For example, the tracking system 112 that is implemented in at least one glove of the pair of gloves 102 includes the RFID reader 144 that interrogates the RFID tag 416 of the component 402.

At 508, an identification response is received from the RFID tag associated with the component responsive to the RFID reader interrogation of the RFID tag. For example, the RFID reader that interrogates the RFID tag 416 of the component 402 receives an identification response of the unique item input device 412 from the RFID tag 416 that is associated with the component 402.

At 510, the tracking system communicates the item identifier of the component to a device that is in communication with the tracking system of the wearable article. For example, the tracking system 112 includes the wireless radio system or systems 134 and communicates the item identifier 412 of the component 402 to the independent device 408 that is in communication with the tracking system 112 of the at least one glove or pair of gloves 102.

At 512, a visual indication is displayed of where to install the component in the structure and/or how to install the component in the structure. For example, the device 408 displays the visual indication 420 of where to install the component 402 in a structure and/or how to install the component 402 in the structure. The exploded assembly diagram of a vehicle system (e.g., a structure) is displayed on the device 408 as the visual indication 420, and other indications can also be displayed to assist the user with component placement in the structure. For example, the component 402, which the user has picked up and/or is moving, is identified in the exploded assembly diagram with a visual indication 422 that indicates where to install the component. Another visual indication 424 also indicates how to install the component 402 in the structure.

Figure 6:
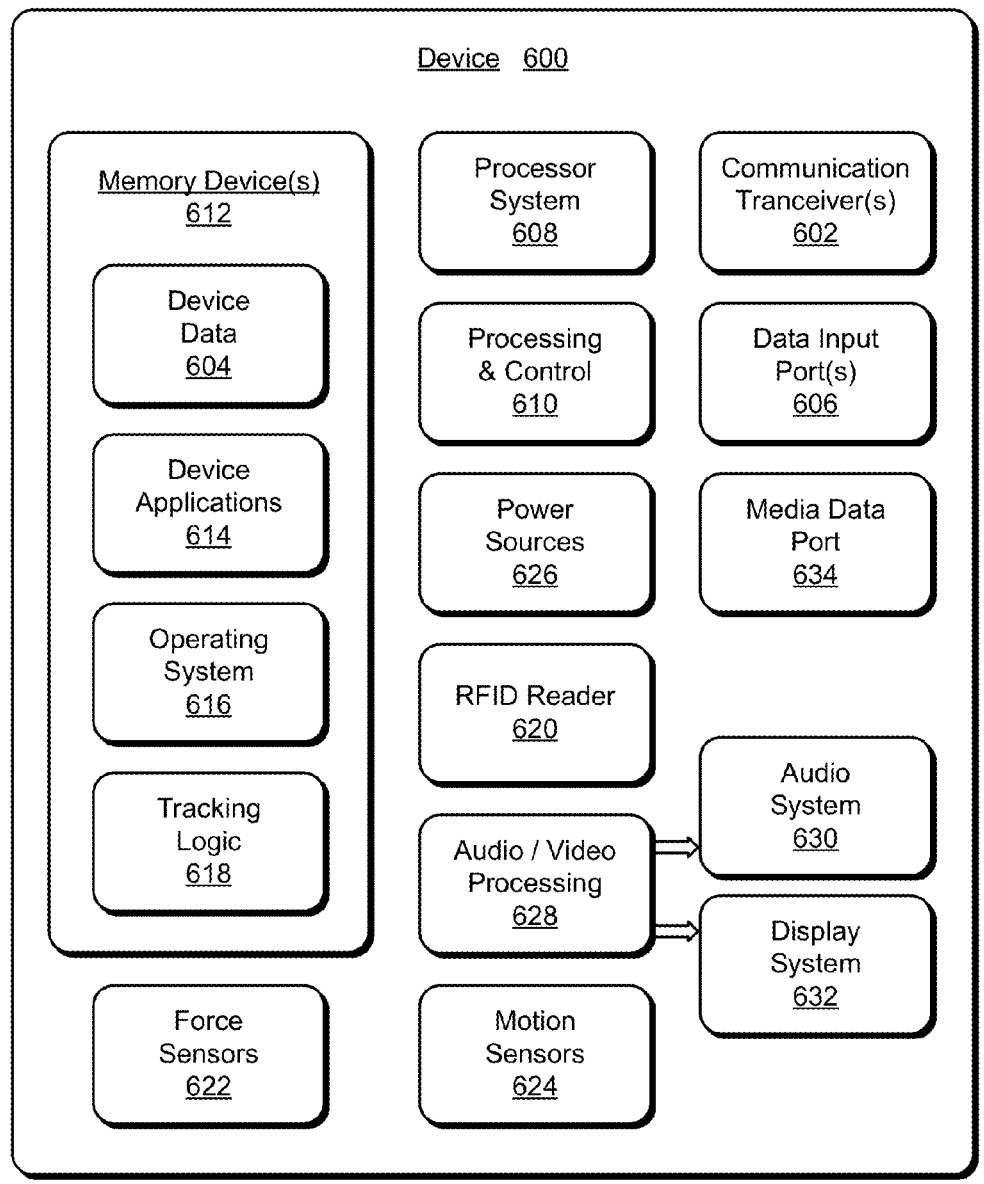
FIG. 6 illustrates various components of an example device that can implement aspects of a RFID-based hand sensory apparatus for monitoring handled inventory.

FIG. 6 illustrates various components of an example device 600 in which aspects of a RFID-based hand sensory apparatus for monitoring handled inventory can be implemented. The example device 600 can be implemented as any of the devices described with reference to the previous FIGS. 1-5, such as any type of client device, mobile phone, tablet, computing, communication, entertainment, gaming, media playback, and/or other type of electronic device, to include the tracking system 112 implemented as a "device" that is integrated in a wearable article, such as one or both of the gloves of the pair of gloves 102. For example, the tracking system 112 and the device 210 shown in FIGS. 1 and 2 may be implemented as the example device 600.

The device 600 includes communication transceivers 602 that enable wired and/or wireless communication of device data 604 with other devices, such as tracking data, package tracking data, and information related to package handling activity as described with reference to FIGS. 1-5. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory 612 (e.g., memory devices) that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory 612 provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on. In this example, the device 600 includes tracking logic 618 that implements aspects of a RFID-based hand sensory apparatus for monitoring handled inventory, and may be implemented with hardware components and/or in software, such as when the device 600 is implemented as the tracking system 112 described with reference to FIGS. 1-5. An example of the tracking logic 618 is the tracking logic 138 that is implemented as an application or component in the tracking system 112.

The device 600 can also include a radio-frequency identification (RFID) reader 620, as well as force sensors 622 and motion sensors 624. The device 600 can also include one or more power sources 626, such as when the device is implemented as a mobile device (e.g., the tracking system 112 that is integrated into one or both of the gloves of the pair of gloves 102). The power sources may include a charging and/or power system, and can be implemented as a flexible strip battery, a rechargeable battery, a charged super-capacitor, and/or any other type of active or passive power source.

The device 600 also includes an audio and/or video processing system 628 that generates audio data for an audio system 630 and/or generates display data for a display system 632. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 634. In implementations, the audio system and/or the display system are integrated components of the example device. Alternatively, the audio system and/or the display system are external, peripheral components to the example device.

Although aspects of a RFID-based hand sensory apparatus for monitoring handled inventory have been described in language specific to features and/or methods, the subject of the appended claims is not necessarily limited to the specific features or methods described. Rather, the specific features and methods are disclosed as example implementations of a RFID-based hand sensory apparatus for monitoring handled inventory, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A system comprising: a wearable article worn by a user who moves items, each of the items having a radio-frequency identification (RFID) tag; a RFID reader designed to interrogate the RFID tags and receive an identification response from each of the RFID tags associated with the respective items; a tracking system implemented in the wearable article, the tracking system comprising: at least one force sensor to register a force on an item; a motion sensor to sense motion of the wearable article; and tracking logic that initiates the RFID reader to interrogate the RFID tag of the item based on the force on the item and the motion of the wearable article.

Alternatively or in addition to the above described system, any one or combination of: The item is a package for delivery; and the tracking logic verifies that the item corresponds to an order for the item based on the identification response to the RFID reader from the RFID tag of the item. The tracking logic generates user feedback as verification that the item corresponds to the order for the item. The user feedback is at least one of a visible verification, an audio verification, or a haptic feedback verification that the item corresponds to the order for the item. The items are packages for delivery; the tracking logic verifies that a group of the items corresponds to an order for the group of the items based on the identification responses to the RFID reader from each of the RFID tags associated with the respective items; and the tracking logic generates user feedback as verification that the items correspond to the order for the items. The item is a component for assembly in a structure; and the tracking system communicates an identifier of the item to a device that displays a visual indication of at least one of where to install the component in the structure and how to install the component in the structure. The tracking system that is implemented in the wearable article comprises the RFID reader. The tracking system comprises a wireless radio system to communicate with a device that is in communication with the tracking system of the wearable article; and the device comprises the RFID reader that interrogates the RFID tags of the items. The wearable article is a glove of a pair of gloves, and the tracking system comprises multiple force sensors that register the force on the item, the multiple force sensors in the glove including at least one palm force sensor and finger force sensors. The wearable article is a pair of gloves; the tracking system is implemented in both a right-hand glove and a left-hand glove of the pair of gloves; and the tracking system comprises a wireless radio system to synchronize tracking data between the tracking systems of the pair of gloves.

A system comprising: a wearable article worn by a user who moves a container of one or more items, each of the one or more items having a radio-frequency identification (RFID) tag; a RFID reader designed to interrogate the RFID tags and receive an identification response from each of the RFID tags associated with the respective one or more items in the container; a tracking system implemented in the wearable article, the tracking system comprising: at least one force sensor to register a force on the container; a motion sensor to sense motion of the wearable article; and tracking logic that initiates the RFID reader to interrogate the RFID tags of the one or more items in the container based on the force on the container and the motion of the wearable article.

Alternatively or in addition to the above described system, any one or combination of: The RFID reader is affixed to the container to interrogate the RFID tags of the one or more items in the container. The tracking system that is implemented in the wearable article includes the RFID reader that interrogates the RFID tags of the one or more items in the container. The tracking system comprises a wireless radio system to communicate with a device that is in communication with the tracking system of the wearable article; and the device comprises the RFID reader that interrogates the RFID tags of the one or more items in the container.

A method comprising: registering a force on a container of items by a user who moves the container, each of the items having a radio-frequency identification (RFID) tag, said registering the force with a force sensor of a tracking system implemented in a wearable article worn by the user; sensing motion of the wearable article with a motion sensor of the tracking system; and initiating a RFID reader to interrogate the RFID tags of the items in the container based on the force on the container and the motion of the wearable article.

Alternatively or in addition to the above described method, any one or combination of: The RFID reader is affixed to the container to interrogate the RFID tags of the items in the container. The tracking system that is implemented in the wearable article includes the RFID reader that interrogates the RFID tags of the one or more items in the container. The method further comprising communicating with a device that is in communication with the tracking system of the wearable article; and wherein the device comprises the RFID reader that interrogates the RFID tags of the items in the container. The method further comprising receiving an identification response from each of the RFID tags associated with the respective items in the container responsive to the RFID reader interrogation of the RFID tags. The method further comprising verifying that the items in the container correspond to an order for the items based on the identification responses from the RFID tags of the respective items.

The invention claimed is:

1. A system, comprising:
a wearable article worn by a user who moves items, each of the items having a radio-frequency identification (RFID) tag;
a RFID reader designed to interrogate the RFID tags and receive an identification response from each of the RFID tags associated with the respective items;
a tracking system implemented in the wearable article, the tracking system comprising:
at least one force sensor to register a force on an item;
a motion sensor to sense motion of the wearable article; and
tracking logic that initiates the RFID reader to interrogate the RFID tag of the item based on the force on the item and the motion of the wearable article.

2. The system as recited in claim 1, wherein:
the item is a package for delivery; and
the tracking logic verifies that the item corresponds to an order for the item based on the identification response to the RFID reader from the RFID tag of the item.

3. The system as recited in claim 2, wherein the tracking logic generates user feedback as verification that the item corresponds to the order for the item.

4. The system as recited in claim 3, wherein the user feedback is at least one of a visible verification, an audio verification, or a haptic feedback verification that the item corresponds to the order for the item.

5. The system as recited in claim 1, wherein:
the items are packages for delivery;
the tracking logic verifies that a group of the items corresponds to an order for the group of the items based on the identification responses to the RFID reader from each of the RFID tags associated with the respective items; and
the tracking logic generates user feedback as verification that the items correspond to the order for the items.

6. The system as recited in claim 1, wherein:
the item is a component for assembly in a structure; and
the tracking system communicates an item identifier of the component to a device that displays a visual indication of at least one of where to install the component in the structure and how to install the component in the structure.

7. The system as recited in claim 1, wherein the tracking system that is implemented in the wearable article comprises the RFID reader.

8. The system as recited in claim 1, wherein:
the tracking system comprises a wireless radio system to communicate with a device that is in communication with the tracking system of the wearable article; and
the device comprises the RFID reader that interrogates the RFID tags of the items.

9. The system as recited in claim 1, wherein the wearable article is a glove of a pair of gloves, and the tracking system comprises multiple force sensors that register the force on the item, the multiple force sensors in the glove including at least one palm force sensor and finger force sensors.

10. The system as recited in claim 1, wherein:
the wearable article is a pair of gloves;
the tracking system is implemented in both a right-hand glove and a left-hand glove of the pair of gloves; and
the tracking system comprises a wireless radio system to synchronize tracking data between the tracking systems of the pair of gloves.

11. A system, comprising:
a wearable article worn by a user who moves a container of one or more items, each of the one or more items having a radio-frequency identification (RFID) tag;
a RFID reader designed to interrogate the RFID tags and receive an identification response from each of the RFID tags associated with the respective one or more items in the container;
a tracking system implemented in the wearable article, the tracking system comprising:
at least one force sensor to register a force on the container;
a motion sensor to sense motion of the wearable article; and
tracking logic that initiates the RFID reader to interrogate the RFID tags of the one or more items in the container based on the force on the container and the motion of the wearable article.

12. The system as recited in claim 11, wherein the RFID reader is affixed to the container to interrogate the RFID tags of the one or more items in the container.

13. The system as recited in claim 11, wherein the tracking system that is implemented in the wearable article includes the RFID reader that interrogates the RFID tags of the one or more items in the container.

14. The system as recited in claim 11, wherein:
the tracking system comprises a wireless radio system to communicate with a device that is in communication with the tracking system of the wearable article; and
the device comprises the RFID reader that interrogates the RFID tags of the one or more items in the container.

15. A method, comprising:
registering a force on a container of items by a user who moves the container, each of the items having a radio-frequency identification (RFID) tag, said registering the force with a force sensor of a tracking system implemented in a wearable article worn by the user;
sensing motion of the wearable article with a motion sensor of the tracking system; and
initiating a RFID reader to interrogate the RFID tags of the items in the container based on the force on the container and the motion of the wearable article.

16. A method as recited in claim 15, wherein the RFID reader is affixed to the container to interrogate the RFID tags of the items in the container.

17. A method as recited in claim 15, wherein the tracking system that is implemented in the wearable article includes the RFID reader that interrogates the RFID tags of the one or more items in the container.

18. A method as recited in claim 15, further comprising:
communicating with a device that is in communication with the tracking system of the wearable article; and
wherein the device comprises the RFID reader that interrogates the RFID tags of the items in the container.

19. A method as recited in claim 15, further comprising:
receiving an identification response from each of the RFID tags associated with the respective items in the container responsive to the RFID reader interrogation of the RFID tags.

20. A method as recited in claim 19, further comprising:
verifying that the items in the container correspond to an order for the items based on the identification responses from the RFID tags of the respective items.

* * * * *